(12) United States Patent
Blount (10) Patent No.: US 9,155,992 B2
(45) Date of Patent: Oct. 13, 2015

(54) MASS TRANSFER APPARATUS AND METHOD FOR SEPARATION OF GASES

(71) Applicant: Savannah River Nuclear Solutions, LLC, Aiken, SC (US)

(72) Inventor: Gerald C. Blount, North Augusta, SC (US)

(73) Assignee: Savannah River Nuclear Solutions, LLC, Alken, SC (US)

( * ) Notice: Subject to any disclaimer, the term of this patent is extended or adjusted under 35 U.S.C. 154(b) by 0 days.

(21) Appl. No.: 14/487,235

(22) Filed: Sep. 16, 2014

(65) Prior Publication Data

US 2015/0075375 A1 Mar. 19, 2015

Related U.S. Application Data

(60) Provisional application No. 61/878,235, filed on Sep. 16, 2013.

(51) Int. Cl.
*B01D 53/18* (2006.01)
*B01D 53/14* (2006.01)
*B01F 3/04* (2006.01)

(52) U.S. Cl.
CPC ............ *B01D 53/18* (2013.01); *B01D 53/1406* (2013.01); *B01D 53/1425* (2013.01); *B01D 53/1475* (2013.01); *B01F 3/04248* (2013.01); *B01F 3/04262* (2013.01); *B01D 2252/103* (2013.01)

(58) Field of Classification Search
CPC ............ B01F 3/04262; B01F 3/04248; B01D 2252/103; B01D 53/1425; B01D 53/18; B01D 53/1406
See application file for complete search history.

(56) References Cited

U.S. PATENT DOCUMENTS

| | | | | |
|---|---|---|---|---|
| 3,584,440 A | * | 6/1971 | Vigil | ............................... 96/250 |
| 3,780,805 A | | 12/1973 | Green | |
| 3,871,451 A | | 3/1975 | Brown | |
| 3,989,488 A | * | 11/1976 | Wisting | ........................ 96/237 |
| 4,187,910 A | | 2/1980 | Cornelius et al. | |

(Continued)

FOREIGN PATENT DOCUMENTS

EP 2 058 471 A1 5/2009
WO WO 2007/133461 A2 11/2007

OTHER PUBLICATIONS

McMillan Burton and Steven L. Bryant; *Surface dissolution: minimizing groundwater impact and leakage risk simultaneously*; Energy Procedia 08. GHGT-9; The University of Texas at Austin; Austin, TX; 8 pages, 2008.

(Continued)

*Primary Examiner* — Duane Smith
*Assistant Examiner* — Stephen Hobson
(74) *Attorney, Agent, or Firm* — Dority & Manning, P.A.

(57) ABSTRACT

A process and apparatus for separating components of a source gas is provided in which more soluble components of the source gas are dissolved in an aqueous solvent at high pressure. The system can utilize hydrostatic pressure to increase solubility of the components of the source gas. The apparatus includes gas recycle throughout multiple mass transfer stages to improve mass transfer of the targeted components from the liquid to gas phase. Separated components can be recovered for use in a value added application or can be processed for long-term storage, for instance in an underwater reservoir.

11 Claims, 5 Drawing Sheets

(56) References Cited

U.S. PATENT DOCUMENTS

| | | | |
|---|---|---|---|
| 4,212,354 A | 7/1980 | Guinn | |
| 4,250,962 A | 2/1981 | Madgavkar et al. | |
| 4,593,763 A | 6/1986 | Burke | |
| 4,762,178 A | 8/1988 | Falls et al. | |
| 5,160,714 A * | 11/1992 | Hardison | 423/220 |
| 5,439,054 A | 8/1995 | Chaback et al. | |
| 6,165,433 A * | 12/2000 | Chakravarti et al. | 423/229 |
| RE39,007 E | 11/2002 | Eaton | |
| 6,759,018 B1 * | 7/2004 | Arno et al. | 423/210 |
| 6,767,471 B2 | 7/2004 | Max | |
| 6,808,693 B2 | 10/2004 | Arnaud et al. | |
| 7,424,999 B2 * | 9/2008 | Xu et al. | 261/97 |
| 8,047,509 B2 * | 11/2011 | Towler | 261/118 |
| 8,268,049 B2 * | 9/2012 | Davydov | 95/199 |
| 8,337,604 B1 * | 12/2012 | St. Amant et al. | 96/351 |
| 8,518,157 B2 * | 8/2013 | Bell et al. | 95/210 |
| 8,783,371 B2 | 7/2014 | Blount et al. | |
| 2003/0047309 A1 | 3/2003 | Thomas et al. | |
| 2008/0179766 A1 * | 7/2008 | Lee et al. | 261/114.1 |
| 2012/0238793 A1 * | 9/2012 | Cullinane et al. | 585/833 |
| 2012/0269690 A1 * | 10/2012 | Iijima et al. | 422/168 |
| 2014/0245887 A1 * | 9/2014 | Pellegrin et al. | 95/150 |

OTHER PUBLICATIONS

Grant J. Ducan and Catherine A. Hartford; *Design operation of acid gas injection/disposal wells*; World Oil, Oct. 1998.

International Patent Application No. PCT/US2014/055758; filing date Sep. 16, 2014; International Search Report and Written Opinion, dated Dec. 22, 2014.

* cited by examiner

MASS TRANSFER APPARATUS AND METHOD FOR SEPARATION OF GASES

CROSS REFERENCE TO RELATED APPLICATION

This application claims filing benefit of U.S. Provisional Patent Application Ser. No. 61/878,235 having a filing date of Sep. 16, 2013, which is incorporated herein in its entirety.

STATEMENT AS TO RIGHTS TO INVENTIONS MADE UNDER FEDERALLY SPONSORED RESEARCH

This invention was made with Government support under Contract No. DE-AC09-08SR22470 awarded by the United States Department of Energy. The Government has certain rights in the invention.

BACKGROUND

The recovery of off-gases from manufacturing and processing plants can decrease detrimental effects of industry on both the environment and individuals. Moreover, recovered gases can often add value to a process, for instance as a fuel or as a raw material in another process. Various methods have been developed to recover off-gases, including the utilization of scrubbers, combustion methods, membrane separation systems, and the like. For instance, it is known to use supercritical conditions to trap and store carbon dioxide contained in off-gas. Unfortunately, supercritical conditions are energy intensive and expensive, generally leading to a negative return on investment for the carbon dioxide capture. Moreover, supercritical conditions can be hazardous, and danger exists even with expensive safety features in place.

Current understanding of the climate effects caused by release of carbon dioxide to the atmosphere has led to attempts to store or use recovered carbon dioxide rather than simply release it. Unfortunately, storage of recovered carbon dioxide has also been problematic. For instance, attempts have been made to store recovered carbon dioxide in underground storage, but this requires expensive safety traps and adequate geologic cap lock/seals, which has largely restricted suitable storage reservoirs to oil and gas fields. Moreover, release of carbon dioxide through inadvertent escape remains high from underground storage facilities.

Alternatively, it has been proposed to use above ground processing of recovered carbon dioxide by dissolving the carbon dioxide in brine at a surface facility followed by injection of the saturated brine into groundwater. One such methodology is described in the publication *Surface Dissolution: Minimizing Groundwater Impact and Leakage Risk Simultaneously* published in Energy Procedia in 2008 and authored by MacMillan Burton and Steven Bryant. Unfortunately, this concept is very capital and energy intensive and requires numerous injection wells.

Accordingly, what are needed in the art are methods and apparatuses that can efficiently recover gases such as carbon dioxide. Moreover, methods and devices that are cost effective and require only low energy input with wide geographic placement potential would be of great benefit.

SUMMARY

According to one embodiment, disclosed is a separation apparatus for separating gaseous components from one another. The separation apparatus includes a mass transfer stage that has an upper end and a lower end. The mass transfer stage includes a gas injector module, a gas absorption module, and a gas separation module. The gas injector module is at the upper end of the mass transfer stage. The gas injector module includes an inlet for supplying a gaseous flow into the mass transfer stage. More specifically, this gaseous flow is supplied into the gas injector module in the form of bubbles. This module also includes an inlet at the upper end of the mass transfer stage for supplying an aqueous flow into the gas injector module.

The gas absorption module is downstream of and adjacent to the gas injector module and proximal to the lower end of the mass transfer stage as compared to the gas injector module. Thus, liquid flow out of the gas injector module flows into the gas absorption module.

The gas separation module is downstream of and adjacent to the gas absorption module and is at the lower end of the mass transfer stage. Thus, liquid flow out of the gas absorption module flows into the gas separation module. The gas separation module includes a gas trap, a first outlet in fluid communication with the gas trap, and a second outlet for aqueous flow out of the mass transfer stage.

Also disclosed are methods for separating components of a gaseous stream by use of the separation apparatus. For instance, a method can include supplying a first gaseous stream to a gas injection module of a separation apparatus. The first gaseous stream is supplied to the gas injection module in the form of bubbles. In addition, the first gaseous stream includes a first component and a second component, the first component being more soluble in an aqueous liquid than the second component. Upon entry to the gas injection module, the bubbles of the first gaseous stream contact a stream of the aqueous liquid.

Following initial contact between the aqueous liquid and the first gaseous stream, the aqueous fluid flows through a gas absorption module while in contact with the bubbles. During this contact, at least a portion of the first component of the gaseous stream dissolves into the aqueous liquid, while the second component remains in the bubbles.

The method also includes providing a gas separation module downstream of the gas absorption module. Within the gas separation module, the bubbles containing the second component can collect at the gas trap and form a second gaseous stream. A gas outlet at the gas trap can allow this second gaseous stream to exit the gas separation module. A second outlet in the gas separation module can allow the aqueous liquid, now carrying the first component, to exit the mass transfer stage.

Also disclosed is a system incorporating the gas separation apparatus. For instance, a system can include a gas compressor and a flow line. The flow line extends from an upper end to a lower end that is at high pressure, for instance the lower end is at a pressure of about 1000 pounds per square inch or higher.

The system also includes the gas separation apparatus. Specifically, the gas separation apparatus includes multiple mass transfer stages that are located in series with one another at the lower end of the flow line, with each mass transfer stage having an upper end and a lower end. The system also includes a gas supply line that extends from the compressor to the gas injector module of the bottom-most mass transfer stage. Between each consecutive pair of mass transfer stages, a gas line extends from the gas trap outlet of the gas separation module of the lower of the pair to the gas inlet of the gas injector module of the upper of the pair.

These and other features, aspects, and advantages of the present invention will become better understood with reference to the following description and appended claims.

BRIEF DESCRIPTION OF THE FIGURES

A fully enabling disclosure of the present invention, including the best mode thereof to one of ordinary skill in the art, is set forth more particularly in the remainder of the specification, including reference to the accompanying drawings.

FIG. 7 illustrates an in-well system incorporating the gas separation apparatus including an inset (FIG. 7A) illustrating the gas separation apparatus and the complete well incorporating the apparatus (FIG. 7B).

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

DETAILED DESCRIPTION

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. It is to be understood by one of ordinary skill in the art that the present discussion is a description of exemplary embodiments only and is not intended as limiting the broader aspects of the present invention, which broader aspects are embodied in the exemplary constructions.

In general, disclosed herein is a gas separation apparatus, systems incorporating the gas separation apparatus, and methods for utilizing the gas separation apparatus. In operation of the gas separation apparatus, the differential solubility of gaseous components of a gaseous input stream into an aqueous solvent at increased pressure is advantageously utilized to encourage mass transfer of a more soluble component from the gas phase to the liquid phase and thus separate the more soluble components from the less soluble components of the gaseous input stream. In one embodiment, the increased pressure of the system can be hydrostatic pressure and the apparatus can be in a sub-surface location beneath either land or water. This is not a requirement of the system, however, and in other embodiments, the increased pressure can be provided by a non-hydrostatic (i.e., non-sub surface) source.

The gas separation apparatus can operate at low energy input as it can incorporate density differentials of an aqueous liquid as it flow through the system to drive a closed loop flow, thus limiting the necessity of pumps. The apparatus can also utilize high pressure established at the lower end of the apparatus to increase the solubility of the more soluble component in the aqueous solvent and thus to increase recovery of targeted components. In one embodiment, the high pressure can be hydrostatic pressure, further reducing energy input to the system. In addition, the gas separation apparatus can operate without the need for any reactants the use of which could otherwise increase both costs and waste issues of a system. As such, the gas separation apparatus can provide an efficient and low cost route to the separation and recovery or long term storage of a component from a gaseous input stream.

As is known, at constant temperature, the amount of gas dissolved in a liquid solvent (e.g., water) is proportional to the partial pressure of that gas over the solvent. Thus, at increased pressure, the gas will exhibit higher solubility. In addition, at reduced temperature, the gas will exhibit higher solubility. The gas separation apparatus disclosed herein and methods of use for the apparatus take advantage of this characteristic of gases and liquid solvents for the gases to selectively capture a component from a gaseous mixture. For example, the gas separation apparatus can capture about 75% or more, about 85% or more, about 90% or more, or about 95% or more of a targeted component from a gaseous input stream.

The liquid solvent utilized in the gas separation apparatus is water. In one embodiment, pure water can be utilized in an apparatus. This is not a requirement of the methods and systems, however, and in other embodiments an aqueous liquid can be utilized, for instance an aqueous salt solution can be utilized. The other components that are combined with water to form the aqueous liquid can vary depending upon the conditions of use for the apparatus, economic conditions, or other factors. For instance, in one embodiment the system can be utilized in an undersea setting, and the aqueous liquid solvent of the system can be sea water obtained from the local environment. In another embodiment, the system can be utilized in a deep water well, and the aqueous liquid can be obtained from the well, and as such can include salts, minerals, and so forth that can naturally occur in the well water.

Gaseous components as may be separated by use of the gas separation apparatus can include any components that exhibit differential solubility in the aqueous liquid solvent under the high pressure conditions at which the apparatus will be utilized. By way of example, gaseous components that exhibit relatively high solubility in water such as carbon dioxide and/or hydrogen sulfide can be separated from other gaseous components that exhibit lower solubility in water such as, without limitation, methane, nitrogen, oxygen, argon, carbon monoxide, etc. In one particular embodiment, carbon dioxide can be separated from one or more other components of a gaseous mixture.

Figure 1:
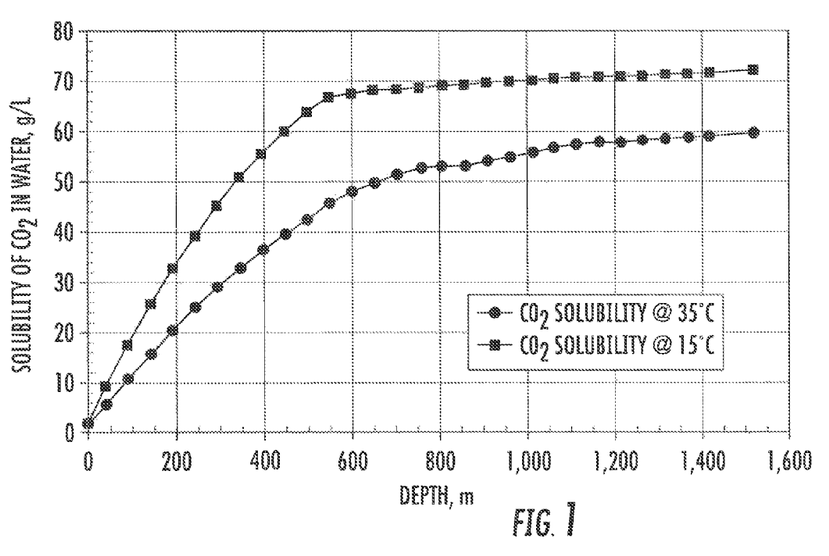
FIG. 1 graphically illustrates the solubility of carbon dioxide with respect to depth below sea level at 35° C. and at 15° C.
Figure 2:
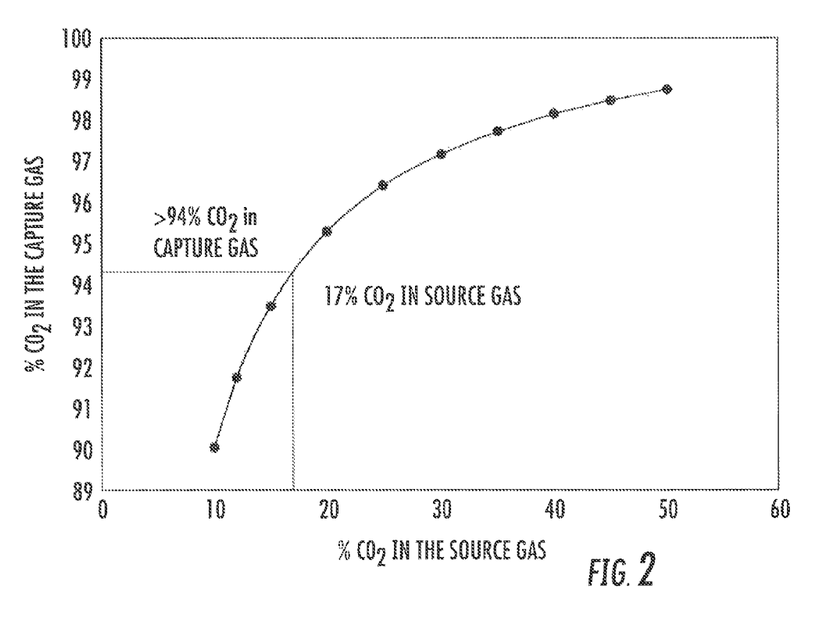
FIG. 2 graphically illustrates the concentration of carbon dioxide in the product capture gas obtained according to the disclosed methods with respect to the concentration of carbon dioxide in the source gas.

The gas separation apparatus will be operated at high pressure, and in one embodiment, at high hydrostatic pressure, which can provide several benefits to a system. For example, FIG. 1 illustrates the solubility of carbon dioxide in water with regard to surface depth at two different temperatures (35° C. and 15° C.). The increased solubility at depth can greatly increase the mass transfer of a gas, e.g., carbon dioxide, from gas to liquid at depth. Moreover, as illustrated in FIG. 2, higher carbon dioxide concentration in a source gas can also drive mass transfer of the carbon dioxide from the gas phase to the liquid phase. Thus, the disclosed devices and methods can be particularly beneficial in separation carbon dioxide from other gaseous components of a source gas.

Moreover, in certain embodiments, the system can be utilized in geographic locations at which temperature decreases with increasing depth, which can further encourage mass transfer of a component from the initial gas phase to the liquid phase of the solvent.

Figure 3:
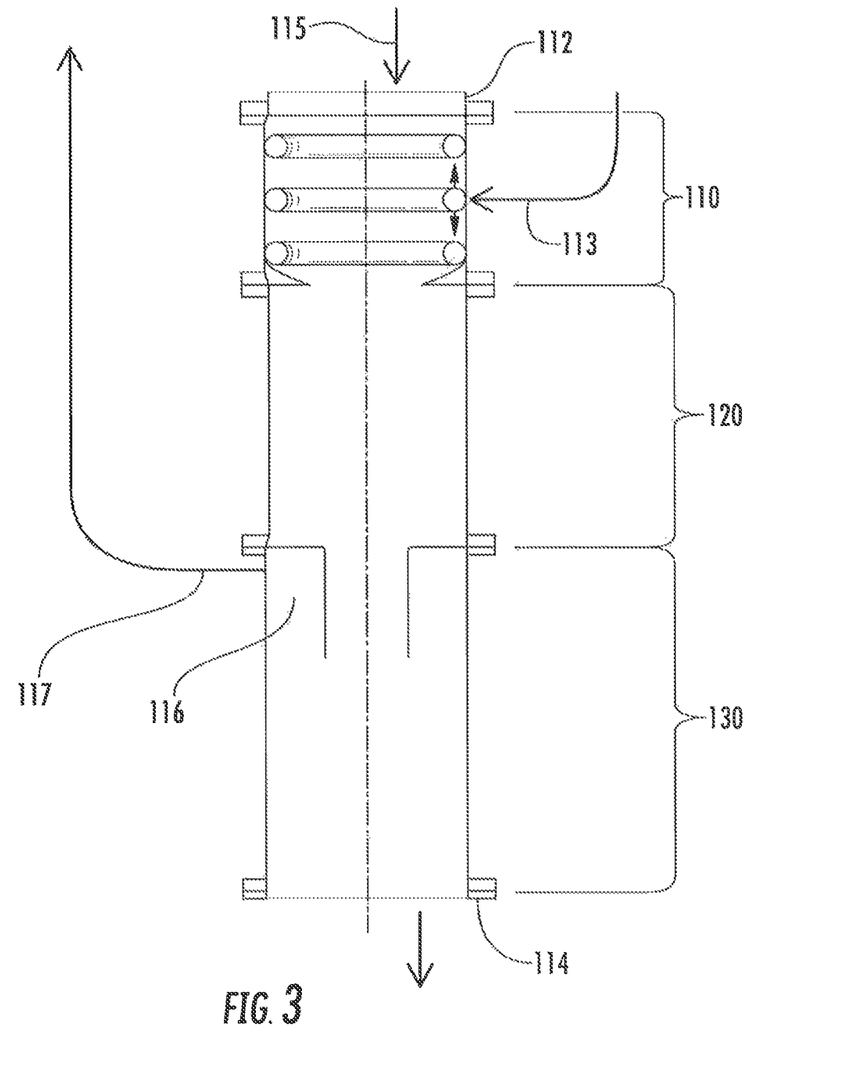
FIG. 3 illustrates a single mass transfer stage of a gas separation apparatus as described herein.

A gas separation apparatus includes a plurality of mass transfer stages, one stage of which is illustrated in FIG. 3. A mass transfer stage includes three different modules: a gas injection module 110, a gas absorption module 120, and a gas separation module 130.

During use, the gas separation apparatus will be placed such that it has an upper end that will be at lower pressure, e.g., closer to the surface of the water or and in which the apparatus is utilized, and a lower end that is opposite the upper end and at a higher pressure than the upper end. Accordingly, each mass transfer stage will likewise include an upper end and a lower end with the gas injection module 110, the gas absorption module 120, and the gas separation module 130 adjacent one another and located along the length of the apparatus from an upper end 112 to a lower end 114.

The gas injector module 110 includes an inlet 115, for supplying the aqueous flow to the mass transfer stage. The inlet can have a cross sectional area of any suitable size and shape. For instance, the inlet can encompass the entire cross sectional area of the line forming the gas injector module 110, the gas absorption module 120, and the gas separation module 130.

The gas injection module 110 also includes an inlet 113 for supplying a gaseous flow into the mass transfer stage. The inlet 113 is designed such that the gaseous flow will enter the mass transfer stage as a stream of bubbles. Any inlet design as is known in the art that can form gaseous bubbles can be utilized at the inlet 113. For example, a manifold, one or more nozzles, one or more perforated lines, etc. can be utilized. In addition, the inlet 113 can inject the bubbles at a single point or at a plurality of points, as desired. For instance, the inlet 113 can inject bubbles at multiple locations across one or more layers that extend across the cross section of the gas injector module 110. The bubbles can be injected at the side or the module 110, within the center of the module 110, or some combination thereof. In one embodiment, the bubbles will be injected in a direction toward the upper end 112 of the mass transfer stage, but this is not a requirement, and the bubbles can be injected in a cross sectional direction across the injection module 110 or alternatively in a direction that is coincident with the flow of the aqueous liquid.

Following injection, the bubbles of the gaseous flow will contact the aqueous liquid that is flowing down through the mass transfer stage and be carried in concurrent flow with the aqueous liquid so as to pass into the gas absorption module 120. As can be seen, the gas absorption module 120 is immediately adjacent to and downstream of the gas injection module. The concurrent flow supports dispersion of the bubbles as well as a decrease in bubble size under the high pressure of the system. This configuration limits bubble coalescence and also promotes mass transfer of the soluble gas into the aqueous solvent of the liquid. Thus, as the aqueous liquid exits the gas absorption module 120, it will contain an amount of dissolved component(s) that has transferred from the gas phase to the liquid phase.

The gas separation module 130 is downstream of and adjacent to the gas absorption module 120, as shown in FIG. 3. As the downward flow of aqueous liquid and bubbles enters the gas separation module 130, the buoyancy of the gaseous bubbles can instigate a counter current flow between the gaseous bubbles and the aqueous liquid.

Within the gas separation module 130 is a gas trap 116. The gas trap 116 can be of any suitable size and shape and can trap the now upwardly flowing bubbles of the now counter current flow. For instance, the gas trap can be a simple U-shaped trap that extends across a portion of the gas separation module 130, for instance, with a toroid shape. The gas separation module 130 can also include an outlet and associated line 117 that is in fluid communication with the gas trap 116. As the bubbles are trapped in the gas trap, they can coalesce. The coalescing bubbles can form a gas stream that can exit the gas separation module 130 via the line 117. In one embodiment, the outlet can include a valve to prevent flow of liquid through the line 117. For example, the outlet can include a pressure controlled valve that can open at a predetermined pressure level within the gas trap, signifying a supply of gas within the gas trap to form a gaseous stream for exit via line 117.

The aqueous liquid that includes the dissolved gas can exit the mass transfer stage at the lower end 114, as shown.

When considering utilization of the gas separation apparatus for capture of carbon dioxide, the apparatus can exhibit particularly low energy consumption due to the nature of an aqueous fluid that includes dissolved carbon dioxide. More specifically, a carbon dioxide aqueous solution has greater density as compared to the same aqueous solution absent the carbon dioxide. In other words, the aqueous solution will become negatively buoyant as it incorporates the carbon dioxide and passes through the mass transfer stage and as such it will be driven to migrate in a downward direction through the mass transfer stage. This characteristic can be utilized to drive flow through the gas separation apparatus, and as such the system can be utilized with no external pumping mechanism necessary for the liquid flow through the apparatus.

Figure 4:
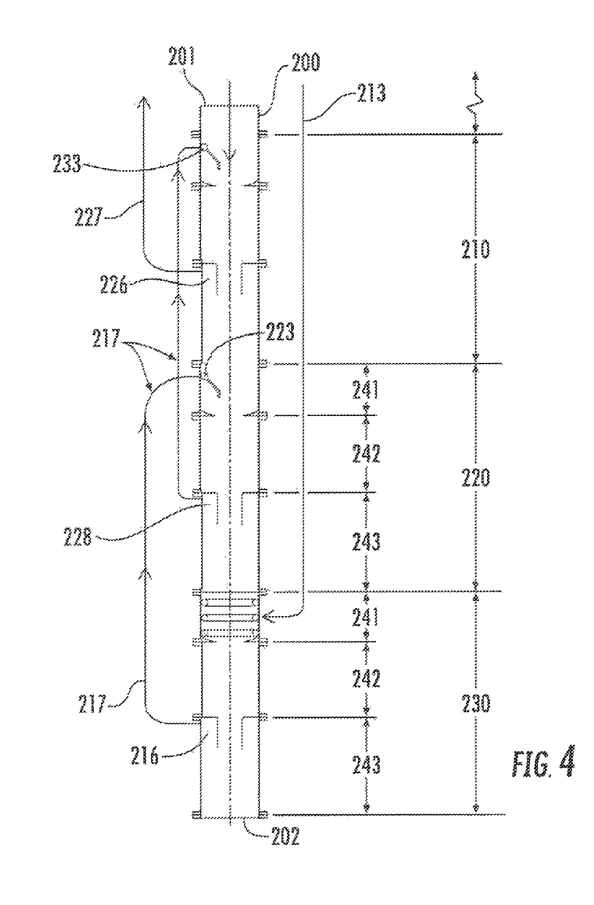
FIG. 4 illustrates several consecutive mass transfer stages of a gas separation apparatus as described herein.

A gas separation apparatus can include a plurality of mass transfer stages along a length of a flow line. FIG. 4 illustrates a portion of a gas separation apparatus including three mass transfer stages 210, 220, 230 that are aligned horizontally in series along a flow line 200 from an upper end 201 to a lower end 202, as shown. Each mass transfer stage 210, 220, 230 includes a gas injection module 241, a gas absorption module 242, and a gas separation module 243, as shown for mass transfer stages 220 and 230.

To improve mass transfer between the gas phase and the liquid phase of the system during use, each mass transfer stage includes a gas recycle line 217 with another mass transfer stage, which, in the illustrated embodiment, is immediately adjacent to the mass transfer stage with which it is paired for gas recycle. For instance, the gas recycle line at 217 from the gas separation module 243 of the lower of a pair of mass transfer stages 230 feeds to the gas inlet 223 at the gas injector module 241 of the upper mass transfer stage 220 of the pair. This is illustrated in FIG. 4, in which the mass transfer stage 230 is the bottom-most mass transfer stage of a gas phase separator. During use, a source gas line 213 feeds a gas source to the gas injector module of the bottom-most mass transfer stage 230, generally under pressure to a bubble generator (e.g., bubble generator rings).

The source gas can be obtained from any suitable source such as, for example, an industrial process that is associated with a carbon dioxide discharge. The carbon dioxide discharge may be from a variety of manufacturing and refining processes which generate high volumes of carbon dioxide including, without limitation, power plants (e.g., petroleum coke-fired power plants), fossil fuel refineries, chemical production facilities, cement formation facilities, steel and aluminum production facilities, or other manufacturing facilities. In one embodiment, the source gas can be natural gas.

The source gas can be collected and transferred to the gas separation apparatus by any means. For example, the operation of the gas separation apparatus can be remote from the source of the carbon dioxide containing industrial gas. In general, the source gas can be processed within a gas compression subsystem in which the source gas is cooled as needed and compressed prior to delivery to the gas separation apparatus.

Figure 5:
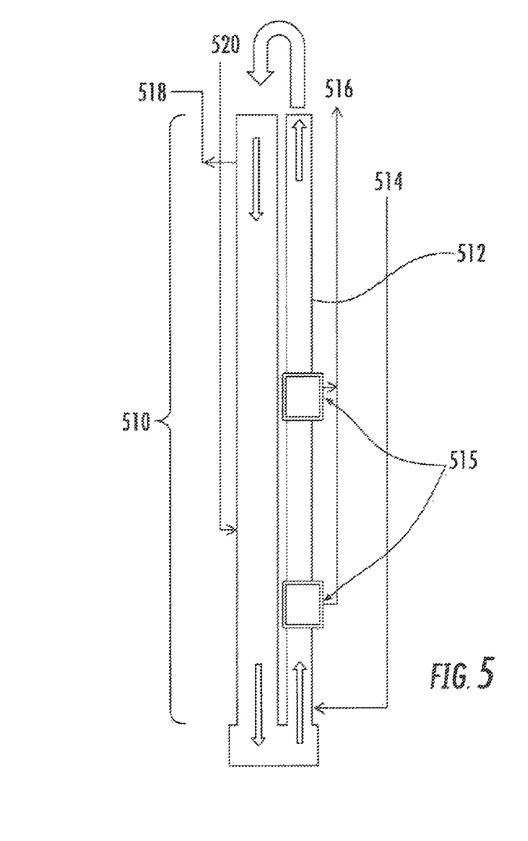
FIG. 5 illustrates a gas separation apparatus as described herein

Bottom-most mass transfer stage 230 of a system as illustrated in FIG. 5 can operate as described above with regard to the single mass transfer stage as illustrated in FIG. 3. Accordingly, following injection of the source gas into the gas injection module and subsequent dissolution of the soluble components of the source gas into the aqueous liquid, a gaseous flow that includes the non-water soluble components of the source gas can exit the mass transfer stage 230 at the gas trap 216 of the mass transfer stage 230, for instance in a recycle line 217. In one embodiment, the gas caught in the gas trap can be at a pressure of about 1000 psi or greater, or about 1200 psi or greater. Thus, the was of the mass transfer stage as well as the line 217 can be of a construction to withstand such high pressure, e.g., about 1000 psi or more.

To improve mass transfer of the system, the line 217 that carries the gaseous flow from the lower mass transfer stage feeds to the gas inlet 223 of the mass transfer stage 220 that is higher than the mass transfer stage 230. Gas inlet 223 can introduce the gaseous flow of line 217 into the gas injection module of mass transfer stage 220 as a flow of bubbles, and the mass transfer process can be repeated within the mass transfer stage 220 to capture any additional soluble components from the gas stream.

The recycle flow can be repeated between the gas trap 228 of the mass transfer stage 220 and the gas inlet 233 of the gas injection module of the higher mass transfer stage 210. Through recycle of the gas stream through multiple mass transfer stages, improved capture of the soluble components of the source gas can be attained, with essentially all of the soluble components removed from the source gas in one embodiment.

At the upper end 201 of the gas separator apparatus, the exit line 227 from the gas trap 226 of the upper mass transfer stage 210 can carry a product gaseous flow that includes one or more non-water soluble gases. This product stream can be further processed as desired. For example, the components of this product stream can be separated from one another according to conventional separation techniques and the separated products (e.g., oxygen) can be utilized in a production facility that can add value to the separation process. In one embodiment, this production line can be utilized to generate energy that can then be sold or utilized to reduce costs in this or a related process. For example, this product line can be utilized to drive a turbine in an energy generation process.

Though illustrated in FIG. 4 with three mass transfer stages, it should be understood that a gas separator apparatus can include any number of mass transfer stages in series with one another. For example, a gas separator apparatus can include about 10 or more mass transfer stages, about 12 or more mass transfer stages, about 15 or more mass transfer stages, or about 20 or more mass transfer stages.

In one embodiment, following capture and separation of the soluble component(s) from the source gas, the soluble component(s) can be separated from the aqueous solvent to provide a product gaseous stream of the separated gas.

FIG. 5 illustrates one such embodiment. Gas injection line 514 can initiate circulation at the bottom-most mass transfer stage. At the lower end of the mass transfer column 510 and following exit from the bottom-most mass transfer stage, the aqueous liquid that includes the dissolved components of the original source gas can flow to a return line 512, as shown. The source gas can be fed to the unit as at 520, as described above. As the liquid flows through the return line, it will encounter lower pressure. For instance hydrostatic pressure can decrease as the return line approaches the surface of the land or water. As pressure decreases, the dissolved component(s) of the liquid will exsolve. Gas recovery devices 515, e.g., gas traps, can be placed in this return line to recover the exsolving gases as at 516. This gas stream can then be further treated as desired. For instance, in those embodiments in which this gas stream includes multiple components, the components can be further separated according to traditional separation methodology. Product gaseous components 518 can be collected and purified in one embodiment for further use as a value added product of the process. In one embodiment, tankage or support systems at the surface of the water or land in which the apparatus is located can extract residual dissolved gas for return to the mass transfer system.

In those embodiments in which carbon dioxide is separated by use of the gas separation apparatus, as the gaseous component(s) of the liquid within the return line exsolve, the liquid will become more buoyant. This can lead to a lift pumping effect that can drive flow through a system, which can be particularly beneficial in a closed-loop system in which the aqueous liquid at the top of the return line 512 is fed back into the upper end of the mass transfer process 510, as illustrated in FIG. 5. Of course, a closed loop system for the liquid flow is not a requirement of the disclosed systems, and water can alternatively be removed from and added to the system as necessary.

Figure 6:
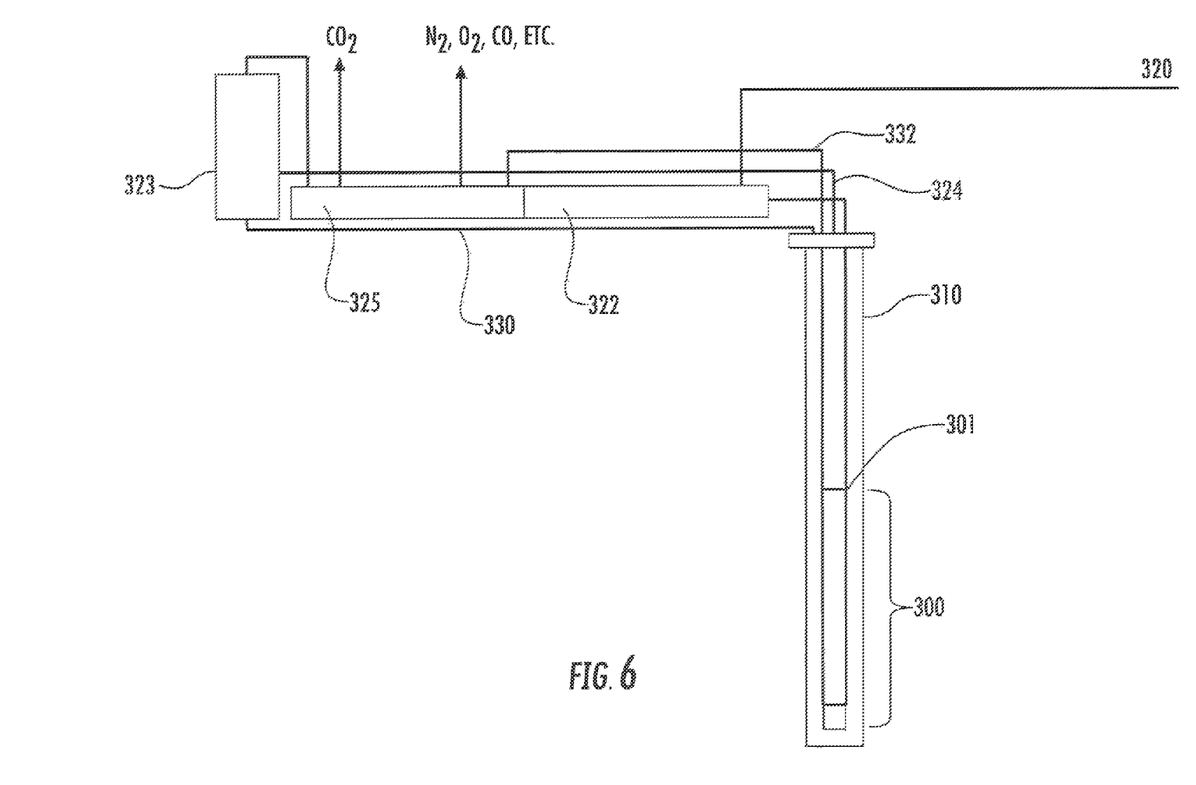
FIG. 6 illustrates one embodiment of a system incorporating a gas separation apparatus.

FIG. 6 illustrates one embodiment of a system that can utilize a gas separator apparatus. In this particular embodiment, the gas separator apparatus 300 is located at the bottom of a well or down-line 310. In general the upper end 301 of the gas separation apparatus (i.e., the upper end of the upper most mass transfer stage) can be about 1000 feet or more beneath the surface of the water or land within which the apparatus is located. For example, the upper end of the gas separation apparatus can be about 1500 feet or more beneath the surface, for instance from about 2500 feet to about 3000 feet beneath the surface, in one embodiment.

The source gas 320 can be pre-processed, for instance via compression 322 and optionally cooled prior to injection into the apparatus 300. The liquid stream can be a closed loop that can, in one embodiment, be self-pumping due to increasing and decreasing buoyancy of the liquid, as discussed above. The system can include two product streams 330, 332, one 330 including the water-soluble components of the source gas (e.g., carbon dioxide), and one 332 including the non-water-soluble components of the source gas (e.g., nitrogen, oxygen, carbon monoxide, etc.). Both streams can be treated for recovery as at 325 for the gases according to known practice. In one embodiment, the product stream 330 can be separated as at 323 at which point the $CO_2$ can be separated from the water with the $CO_2$ subsequently recovered at 325. Moreover, following separation of the product stream 330 at 323, the water can be returned to the apparatus as at 324.

Figure 7A:
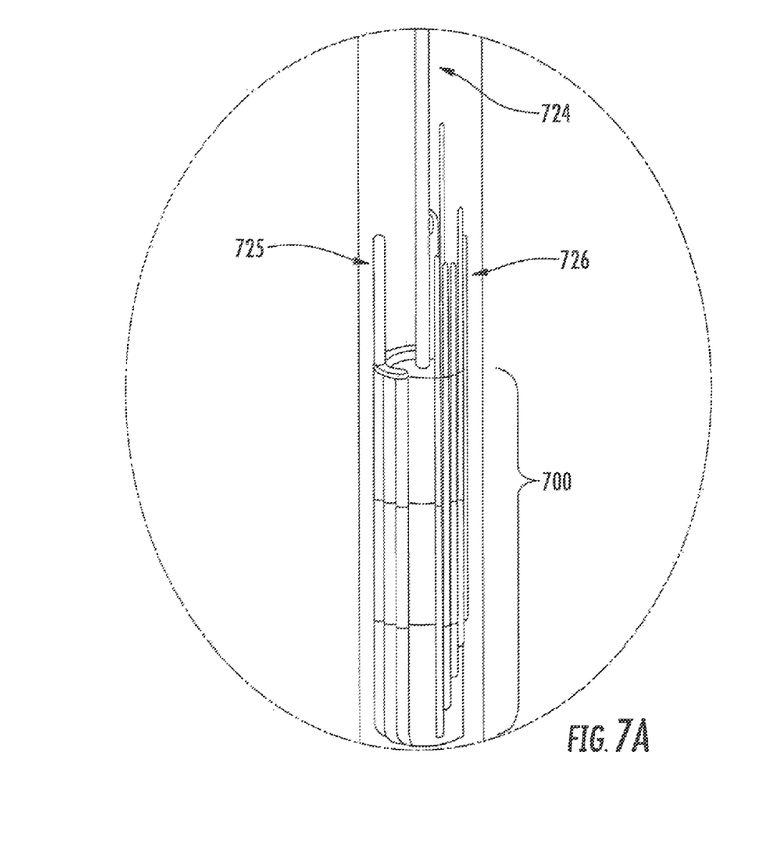
Figure 7B:
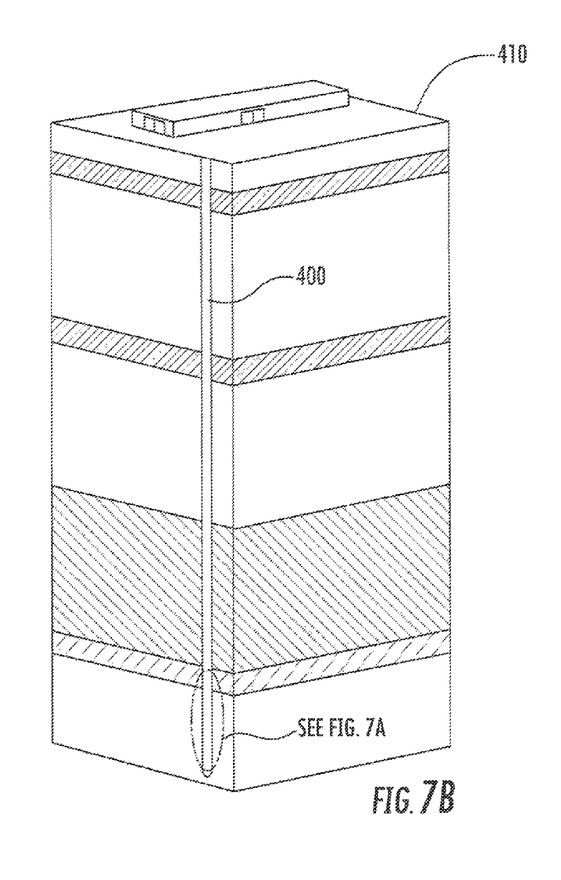

FIG. 7 illustrates a similar embodiment including an expanded view of the gas separation apparatus including several mass transfer stages 700, a water feed 724, gas supply and return lines 726 and a water return line 725 (FIG. 7A). FIG. 7B illustrates the relationship of the gas separation apparatus of FIG. 7A to a down-line 400 and a surface facility 410.

The captured and recovered water-soluble components of the source gas can be utilized in any of a variety of useful application. For instance, captured carbon dioxide can be utilized in enhance oil recovery. Capture and recovery of source gases can positively impact a variety of technologies. For example, over 50% of the thermal energy in coal-generated power is lost in stack emissions. The capture and recovery of water-soluble gases from these stack emissions can allow for the recovery of a portion of these losses and can turn these losses into positive energy generation. Moreover, capture and recovery of green-house gasses such as carbon dioxide can offer benefits to the health of the both the planet and humanity.

Use of the gas separation apparatus need not include recovery of the water-soluble components of the sources gas, and in other embodiments, the gas separation apparatus can be used for long-term storage of the recovered components. For instance, due to the negative buoyancy of a carbon dioxide aqueous solution, the solution at the bottom of a mass transfer process can be stored in an underwater reservoir. As a result, the necessity of a suitable cap lock/seal or geologic trap is not needed in order to contain the dissolved carbon dioxide. The geologic storage of carbon dioxide using the process and apparatus opens up a much larger number and variety of aquifers that are suitable for storage of carbon dioxide saturated water or brine. For example, under the conditions of operation carbon dioxide can be stored in a sub-surface environment in aqueous concentrations of about 6% by mass.

Although preferred embodiments of the disclosed subject matter have been described using specific terms, devices, and methods, such description is for illustrative purposes only. The words used are words of description rather than of limitation. It is to be understood that changes and variations may be made by those of ordinary skill in the art without departing from the spirit or the scope of the present invention that is set forth in the following claims. In addition, it should be understood that aspects of the various embodiments may be interchanged, both in whole or in part. Therefore, the spirit and scope of the appended claims should not be limited to the description of the preferred versions contained therein.

What is claimed is:

1. A separation apparatus comprising a mass transfer stage that has an upper end and a lower end, the mass transfer stage including:
  a gas injector module at the upper end of the mass transfer stage, the gas injector module including a first inlet for supplying a gaseous flow into the mass transfer stage, the gaseous flow being supplied into the gas injector module in the form of bubbles, the gas injector module including a second inlet at the upper end of the mass transfer stage for supplying an aqueous liquid flow into the gas injector module;
  a gas absorption module that is downstream of and adjacent to the gas injector module and proximal to the lower end of the mass transfer stage as compared to the gas injector module such that liquid flow out of the gas injector module flows into the gas absorption module;
  a gas separation module that is downstream of and adjacent to the gas absorption module and is at the lower end of the mass transfer stage such that liquid flow out of the gas absorption module flows into the gas separation module, the gas separation module including a gas trap, a first outlet in fluid communication with the gas trap, and a second outlet for aqueous liquid flow out of the mass transfer stage; and
  a return line in fluid communication with the second outlet of the gas separation module, the return line including a gas trap.

2. The separation apparatus of claim 1, comprising a second mass transfer stage including a gas injection module, a gas absorption module, and a gas separation module.

3. The separation apparatus of claim 2, wherein the second mass transfer stage is adjacent to the first mass transfer stage such that an aqueous liquid flow out of the gas separation module of the second mass transfer stage flows into the gas injection module of the first mass transfer stage.

4. The separation apparatus of claim 3, wherein the first outlet of the gas separation module of the first mass transfer stage directly feeds to a gas net of the gas injection module of the second mass transfer stage.

5. The separation apparatus of claim 2, further comprising one or more additional mass transfer stages, each mass transfer stage including a gas injection module, a gas absorption module, and a gas separation module.

6. The separation apparatus of claim 5, comprising about 10 or more mass transfer stages.

7. The separation apparatus of claim 1, the mass transfer stage including a surrounding wall, the surround wall having a construction to withstand a pressure of about 1000 pounds per square inch or more.

8. The separation apparatus of claim 1, the return line including an upper end, the upper end of the return line being in fluid communication with the second inlet of the gas injector module at the upper end of the mass transfer stage.

9. A system for separating gases from one another, the system comprising:
  a compressor;
  a flow line extending from a water or land surface to a depth of about 1000 feet or more;
  a gas separation apparatus within the flow line, the gas separation apparatus comprising a plurality of mass transfer stages in series with one another and including a top-most mass transfer stage and a bottom-most mass transfer stage, each mass transfer stage including
    a gas injector module at the upper end of the mass transfer stage, the gas injector module including a first inlet for supplying a gaseous flow into the mass transfer stage, the gaseous flow being supplied into the gas injector module in the form of bubbles, the gas injector module including a second inlet at the upper end of the mass transfer stage for supplying an aqueous flow into the gas injector module;
    a gas absorption module that is downstream of and adjacent to the gas injector module and proximal to the lower end of the mass transfer stage as compared to the gas injector module such that liquid flow out of the gas injector module flows into the gas absorption module;
    a gas separation module that is downstream of and adjacent to the gas absorption module and is at the lower end of the mass transfer stage such that liquid flow out of the gas absorption module flows into the gas separation module, the gas separation module including a gas trap, a first outlet in fluid communication with the gas trap, and a second outlet for aqueous flow out of the mass transfer stage; and
  a first gas supply line extending from the compressor to the first inlet of the gas injector module of the bottom-most mass transfer stage; wherein every mass transfer stage of the gas separation apparatus is paired with another mass transfer stage of the gas separation apparatus such that the first outlet of the gas separation module of the lower mass transfer stage of the pair is in fluid communication with the first inlet of the gas injector module of the upper mass transfer stage of the pair.

10. The system of claim 9, further comprising a return line in fluid communication with the second outlet of the gas separation module of the bottom-most mass transfer stage.

11. The system of claim 10, further comprising one or more gas traps on the return line.

* * * * *